J. G. WILSON.
ROTARY ENGINE.
APPLICATION FILED MAY 8, 1912.
1,042,994.
Patented Oct. 29, 1912.
3 SHEETS—SHEET 1.
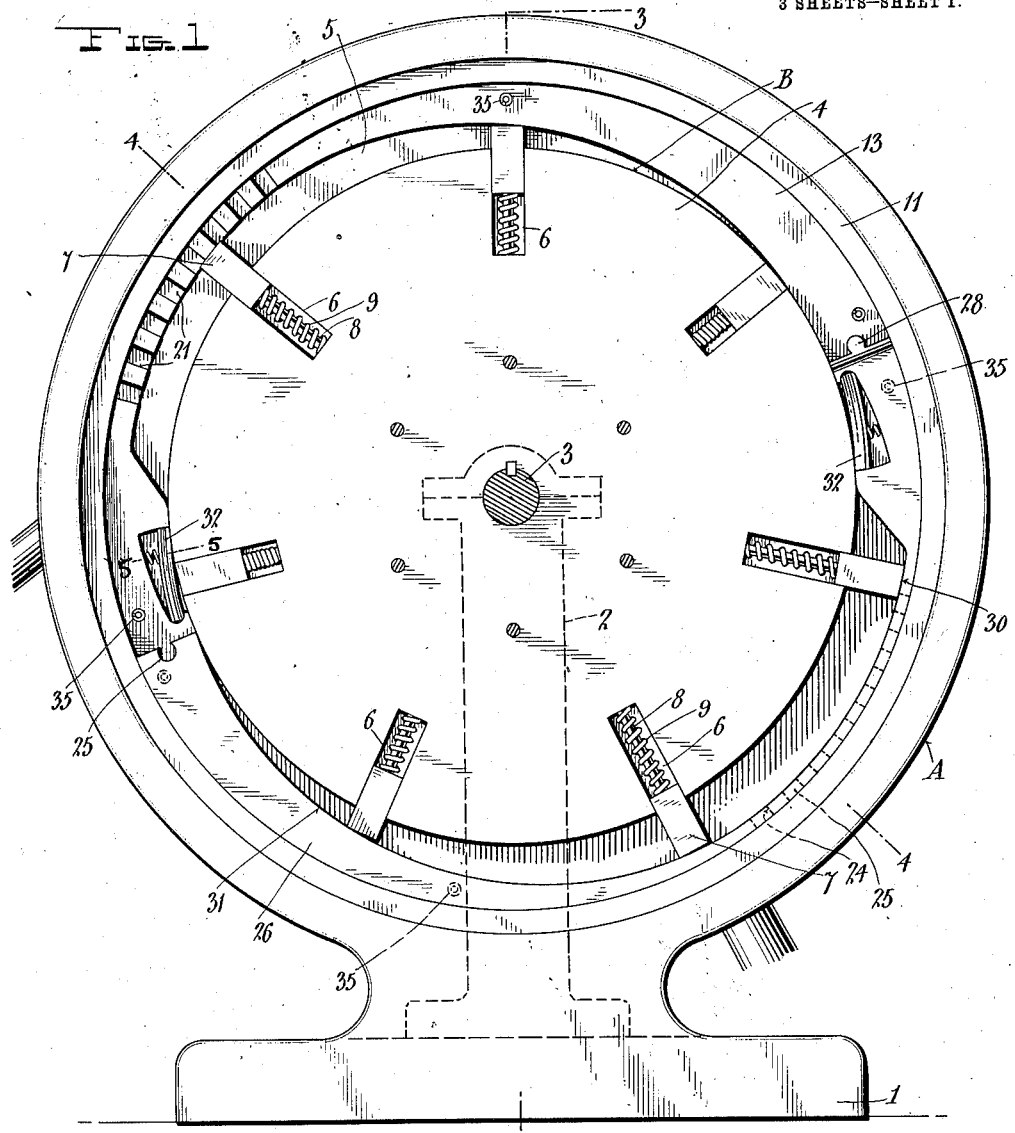
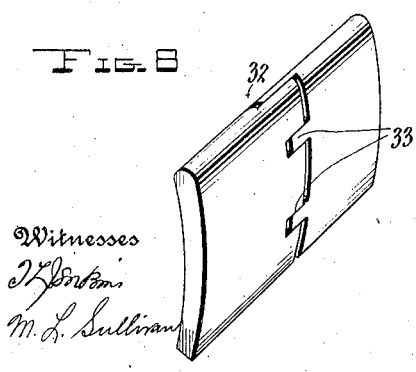
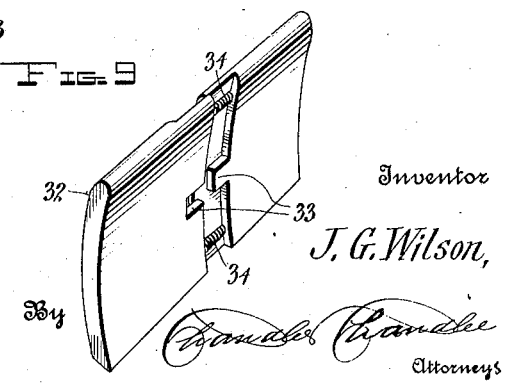
Inventor
J. G. Wilson,
By
Attorneys J. G. WILSON.
ROTARY ENGINE.
APPLICATION FILED MAY 8, 1912.
1,042,994.
Patented Oct. 29, 1912.
3 SHEETS—SHEET 2.
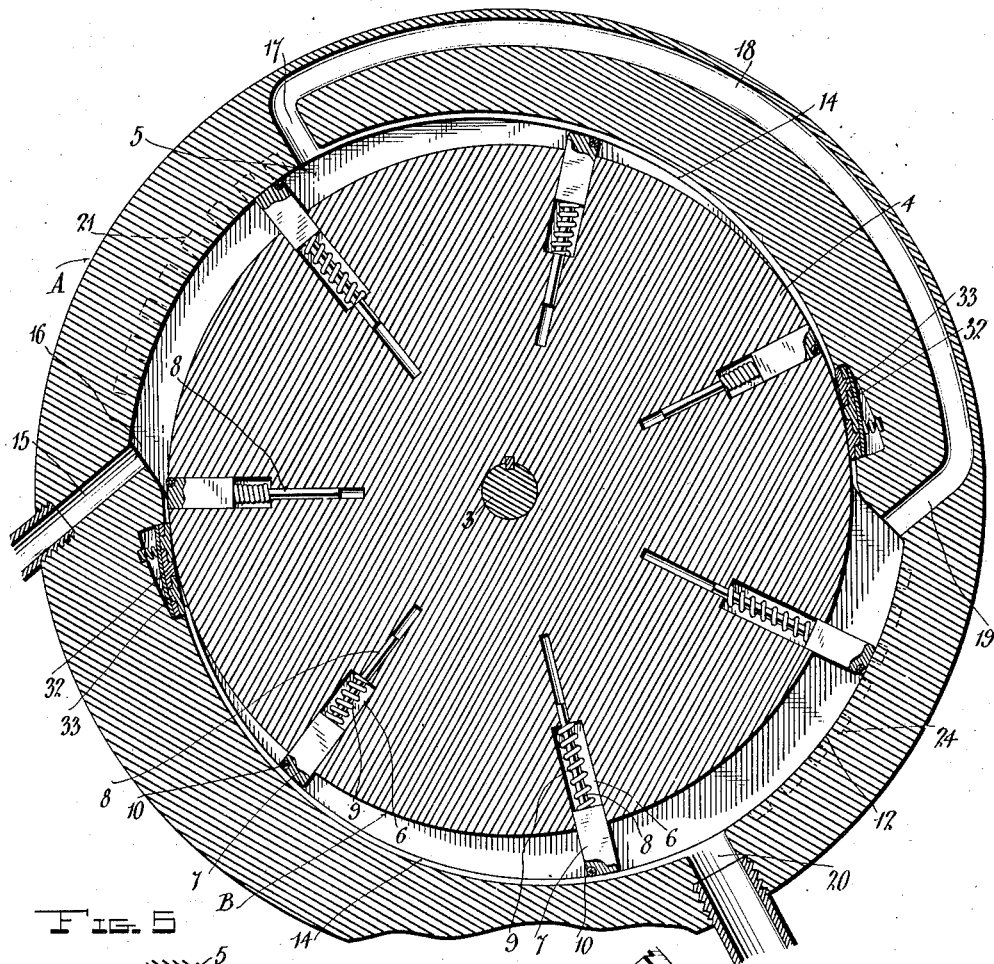
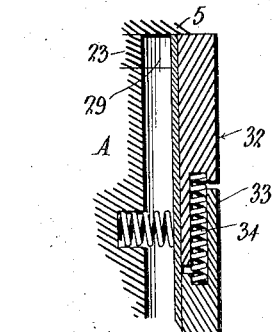
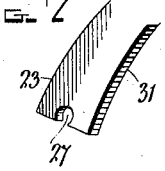
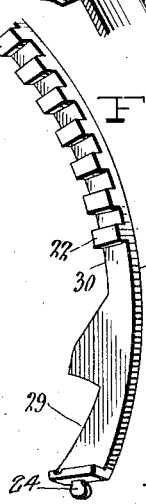
Witnesses
Inventor
J. G. Wilson,
By
Attorneys J. G. WILSON.
ROTARY ENGINE.
APPLICATION FILED MAY 8, 1912.
1,042,994.
Patented Oct. 29, 1912.
3 SHEETS—SHEET 3.
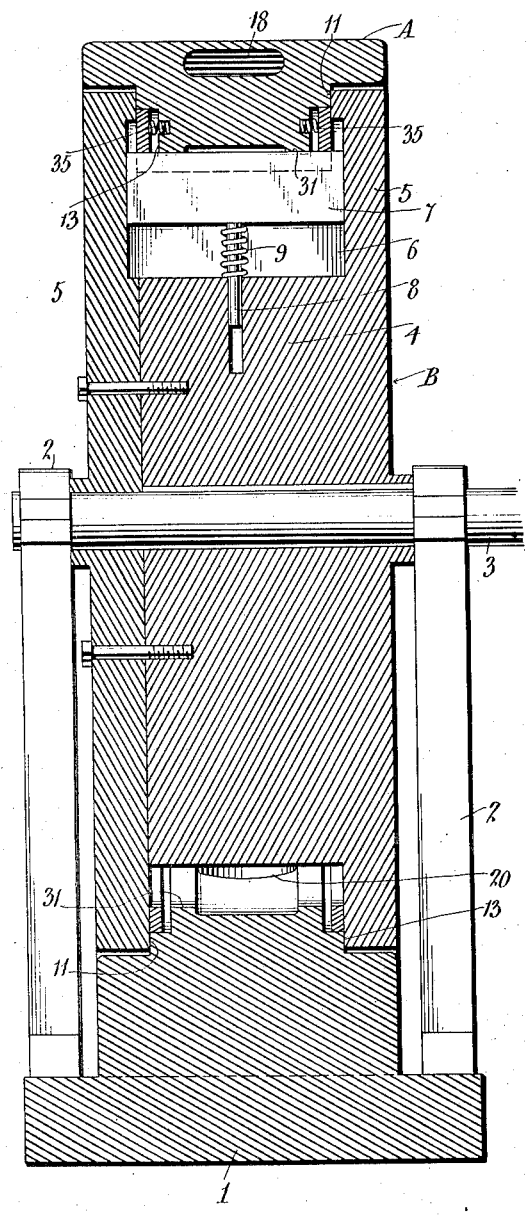
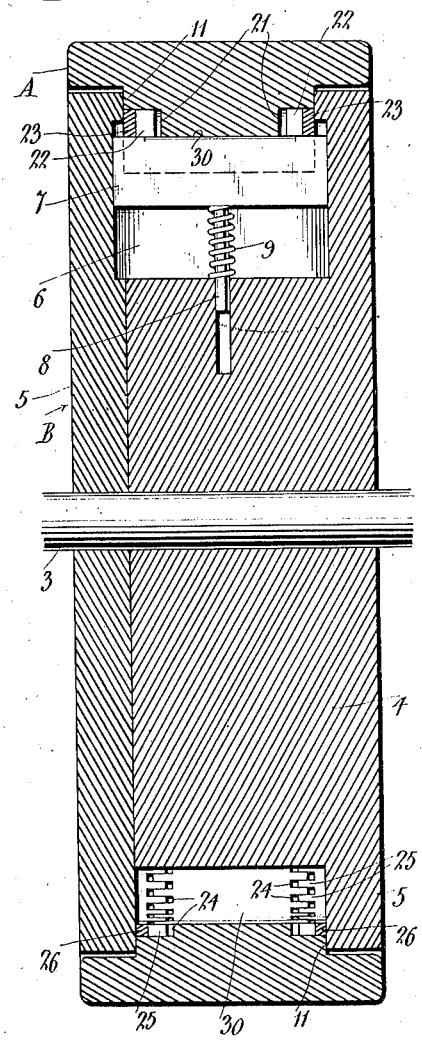
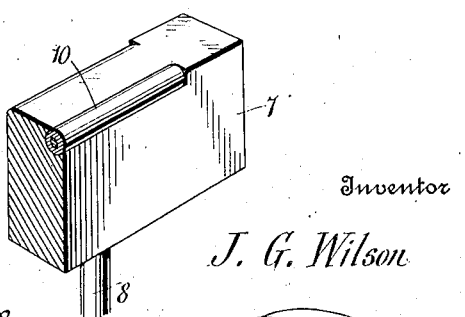
Witnesses
Inventor
J. G. Wilson
By
Attorneys

UNITED STATES PATENT OFFICE.

JAMES G. WILSON, OF COALWOOD, WEST VIRGINIA, ASSIGNOR OF ONE-THIRD TO CARL P. MAHAFFEY, OF PREMIER, WEST VIRGINIA.

ROTARY ENGINE.

1,042,994.  Specification of Letters Patent.  Patented Oct. 29, 1912.

Application filed May 8, 1912. Serial No. 695,959.

*To all whom it may concern:*

Be it known that I, JAMES G. WILSON, a citizen of the United States, residing at Coalwood, in the county of McDowell, State of West Virginia, have invented certain new and useful Improvements in Rotary Engines; and I do hereby declare the following to be a full, clear, and exact description of the invention, such as will enable others skilled in the art to which it appertains to make and use the same.

This invention relates to certain novel and useful improvements in rotary engines.

In carrying out my invention, it is my purpose to provide a simple, compact and powerful engine which may be operated at a relatively low cost to develop its maximum efficiency.

Still a further object of my invention is the provision of an engine having the parts thereof so correlated and arranged that the liability of motive fluid leaking or escaping is obviated, inasmuch as I have provided a novel method of arranging and assembling the packing to avoid this disadvantage.

I also aim to provide an engine which will run easily and positively and which will not be liable to injury or accidents which would require frequent repairs.

With the above recited objects and others of a similar nature in view, my invention consists in the construction, combination and arrangement of parts falling within the scope of the appended claims.

In the accompanying drawings, like characters of reference indicate like parts in all the views, and Figure 1 is a side elevation with one of the plates removed. Fig. 2 is a sectional view. Fig. 3 is a cross sectional view taken on the line 3—3 of Fig. 1. Fig. 4 is a similar view taken on the line 4—4 of Fig. 1. Fig. 5 is a cross sectional view taken on the line 5—5 of Fig. 1. Figs. 6 and 7 are detail perspective fragmentary views of the packing ring section. Figs. 8 and 9 are similar views of the packing plates. Fig. 10 is a detail view, partly in section of one of the pistons.

Referring now to the accompanying drawings in detail, the numeral 1 designates the bed plate of my engine which carries the ring-like casing or stator A. The numerals 2—2 designate the supporting standards carrying the shaft 3 upon which is mounted the revolving member or rotor B. This rotor comprises the hub section 4 carrying the disks 5—5, the entire rotor having the general appearance of a spool and is provided with a series of radially extending sockets or grooves 6 in which slide the piston heads or blocks 7, each piston having a guide rod 8 around which is coiled a tension spring 9, while the wearing edge of each piston is provided with an anti-friction roller bearing 10. It will be evident that the pistons are normally forced outward by the springs thereof in the well known manner employed in this class of engines, and are designed at predetermined times in the revolution of the rotor to be forced inward of their sockets by contact with the eccentric walls or cam surfaces of the stator. The inner faces of the disks 5—5 adjacent to the peripheries thereof ride against the side flanges 11—11 of the ring casing or stator, as will be clearly seen by reference to Figs. 1 and 2. The inner circular wall of the stator is indicated as an entirety by the numeral 12, and is of less width than the cross distance between the two disks 5—5 so that shoulders 13—13 are formed at each side of this stator. This inner wall 12 of the stator is formed with the segmental section 14. The motive fluid inlet is shown at 15, thus penetrating through the wall of the stator, the opening of the port being shown at 16.

The numeral 17 designates a channel communicating with the circumferential channel 18 extending through the wall of the stator and terminating in the port 19 which communicates with the interior of the stator, as will be clearly seen by reference to Figs. 1 and 2. The outlet port is shown at 20.

The walls of the stator between the ports 16 and 17 are formed with notches 21 at either edge thereof, these notches being designed to receive the teeth or projections 22 carried by the segmental packing ring sections 23. Likewise the edges of the circular wall between the port 19 and the outlet 20 are formed with notches or recesses 24 for the reception of the teeth or projections 25 of the eccentric packing ring section 26. Each packing ring section 23 carries at one end a tongue 24 adapted to fit in the notch 25 in the abutting end of the companion ring section 26, while at its opposite end each ring section 23 has a notch 27 for the reception of the tongue 28 at the end of the abutting companion ring section 26. As will be seen by reference to the drawings, each segmental packing ring section is formed with an enlarged end 28 notched as at 29 for the reception for the spring pressed packing plates hereinafter described, each packing ring section thence narrowing as at 30 where it lies between two ports and then widening to form the cam section 31. It will of course be understood that a section 23 taken with the section 26 make up a complete packing ring and that I employ two of such rings, one at each side of the stator. To further effectively pack the engine, I make use of packing plates each formed of two sections. By reference to Figs. 8 and 9, it will be seen that these packing plates which I have designated as an entirety by the numeral 32 have the two sections thereof jointed by the tongue and groove connections 33, while 34 are short springs between the two sections and normally tending to force them apart. These packing plates lie across the notched portions 29 of the packing ring sections and are normally pressed inward toward the center of the engine by the springs 34.

From the above description taken in connection with the accompanying drawings, the construction and the manner of employing my improved rotary engine will be readily apparent.

Referring now to Figs. 1 and 2, it will be seen that as the motive fluid enters through the conduit and the ports 16 to the interior of the casing, it operates on the pistons which are extended and ride in the space between the ports 16 and 17 until the port 17 is reached, where such fluid enters the channel 18, the pistons now striking the gradually widening eccentric surfaces of the interior wall of the stator and of the packing ring thereat, so that such pistons are pushed inward until they reach the port 19 when they are again forced outward by the spring and are subjected to the motive fluid coming through the port 19, until they pass the upper port 20. Between the outward and inlet ports the pistons again ride over the cam surface between those ports and are forced inward of the socket. The packing rings are further preferably provided with suitable springs 35 which tend to hold said packing in working position.

It will be noted that I have provided a compact, efficient type of engine of this general class, and while I have herein shown and described one particular embodiment of my invention, I wish it to be understood that I do not limit myself to all the precise details of construction herein set forth, as modification and variation may be made without departing from the spirit of the invention or exceeding the scope of the claims.

What I claim is:

1. The combination with a ring-like stator having the interior wall thereof formed with cam surfaces and notches in the edges of said walls, of an inlet port and an outlet port for the stator, cam rings formed of sections corresponding to the cam surfaces of the stator, and having projections fitting in the grooves in the interior wall of said stator, a rotor turning within the stator, and comprising a hub portion and side members carried thereby, and pistons sliding in grooves formed in the rotor.

2. In a rotary engine the combination of a ring-like stator having an interior wall with eccentric cam-like surfaces, a rotor within the stator and steam spaces formed between the rotor and the stator, said stator having an inlet port leading to one of said steam spaces, an outlet leading from the other steam spaces, and a channel connecting the two steam spaces, interlocking packing rings corresponding in shape to the cam surfaces of the stator and arranged at the sides of said surfaces, transversely disposed packing plates formed of sections, springs normally tensioned in the packing plates, and spring pressed pistons slidably mounted in radial grooves in the rotor.

In testimony whereof, I affix my signature, in presence of two witnesses.

JAMES G. WILSON.

Witnesses:
S. C. MINNICH,
GLEN BRUCE.